United States Patent [19]

Karlson

[11] 4,013,553
[45] Mar. 22, 1977

[54] FLUID TREATMENT METHOD
[75] Inventor: Eskil L. Karlson, Stamford, Conn.
[73] Assignee: Iconex Systems Incorporated, Stamford, Conn.
[22] Filed: June 4, 1975
[21] Appl. No.: 583,788

Related U.S. Application Data

[62] Division of Ser. No. 448,019, March 4, 1974, Pat. No. 3,912,636.

[52] U.S. Cl. .............................. 210/28; 210/63 Z
[51] Int. Cl.² .......................................... C02C 9/02
[58] Field of Search .............................. 210/24–35, 210/50, 51, 52, 63, 202, 203, 204, 205, 206, 269, 400, 401, 264, 265, 500, 509; 252/2

[56] References Cited

UNITED STATES PATENTS

| | | | |
|---|---|---|---|
| 2,214,925 | 9/1940 | Gutrie | 252/2 |
| 3,062,379 | 11/1962 | Bryan | 210/507 X |
| 3,235,492 | 2/1966 | Andresen et al. | 210/52 |
| 3,325,401 | 6/1967 | Lancy | 210/206 |
| 3,436,213 | 4/1969 | Norris | 210/24 X |
| 3,549,528 | 12/1970 | Armstrong | 210/63 |
| 3,575,852 | 4/1971 | Hughes | 210/28 |
| 3,745,114 | 7/1973 | Dixson | 210/33 |
| 3,801,499 | 4/1974 | Luck | 210/28 |
| 3,855,124 | 12/1974 | Lepidot | 210/202 |
| 3,910,842 | 10/1975 | Karlson | 210/401 |
| 3,912,636 | 10/1975 | Karlson | 210/400 |

OTHER PUBLICATIONS

Industrial Engineering Chemistry, 1955, vol. 47, No. 3, pp. 374–380, C. H. Muendel and W. A. Selke, "Continuous Lock Exchange with an Endless Belt of Phosphorylated Cotton".

*Primary Examiner*—Theodore A. Granger
*Attorney, Agent, or Firm*—George W. Rauchfuss, Jr.

[57] ABSTRACT

This invention relates to methods of removing materials from fluids, and in one embodiment includes an ionically biasable foraminous belt which moves through a multiplicity of transversals to the flow path of said fluid which are sequentially positionally counterdirectional to said flow path.

5 Claims, 6 Drawing Figures

«4,013,553»

FLUID TREATMENT METHOD

REFERENCE TO PRIOR APPLICATION

This application is a divisional application of application Ser. No. 448,019 entitled IMPROVEMENTS IN FLUID TREATMENT APPARATUS which was filed on Mar. 4, 1974, and now U.S. Pat. No. 3,912,636.

BACKGROUND OF THE INVENTION

It is desirable to be able to separate selected materials from fluids, including gases such as air, and liquids such as water. It is known that particles may be removed by physical processes, such as passing the fluid through filters, sieves, or other structures which will catch the particles while allowing the fluid medium to pass. Thus, for example, dust may be removed from the air, silt from water, etc. It is also known that certain materials such as metals, ions and/or colliods, may be removed from fluids by exposing them to surfaces which have an ionic bias, i.e, are either anionically or cationically charged so as to attract, hold, and thereby separate out from the fluid medium materials of opposite ionic bias. In this manner, for example, metals may be extracted from seawater. It is known also that the surface so ionically biased may be in the form of an endless, woven belt moved relative to the fluid medium in question. By this means, the subsequent steps of removing the extracted material and re-establishing the ionic bias of the belt may be facilitated. In this connection, reference is made to U.S. Pat. Nos. 2,678,132; 3,062,379; and 3,486,213.

One of the areas of technical interest which has recently received new interest is that of pollution abatement. Thus, for example, industrial effluents are increasingly being monitored with a view to extracting therefrom materials which contaminate the environment. Although the relatively large particles of such contaminants may be removed with relative ease and low cost, the smaller particles and suspended materials are difficult, and costly, to remove.

Accordingly, it is an object of the present invention to provide methods by which selected materials may be removed from fluid media which are technically reliable, efficient, and effective, and may be economically constructed and operated.

SUMMARY OF INVENTION

Desired objectives may be achieved through the practice of the present invention, one embodiment of which comprises a continuous, ionically biasable foraminous belt moving a path forming a multiplicity of transversals of the flow path of the fluid medium, which transversals are sequentially counter-directional to the direction of flow of the fluid.

This invention may be more clearly understood from the description which follows, and from the attached drawings in which FIG. 1 is a schematic drawing of one embodiment of the present invention, FIG. 2 is a perspective view of a belt which is a sub-combination embodiment of the present invention, FIG. 3 is a cross-sectional drawing of another belt which is a sub-combination embodiment of the present invention, FIG. 4 is a perspective view of another belt which is a sub-combination embodiment of the present invention, FIG. 5 is a cross-sectional drawing of another belt which is a sub-combination embodiment of the present invention, and FIG. 6 is a cross-sectional drawing of another belt which is a sub-combination embodiment of the present invention.

DESCRIPTION OF PREFERRED EMBODIMENT

Figure 1:
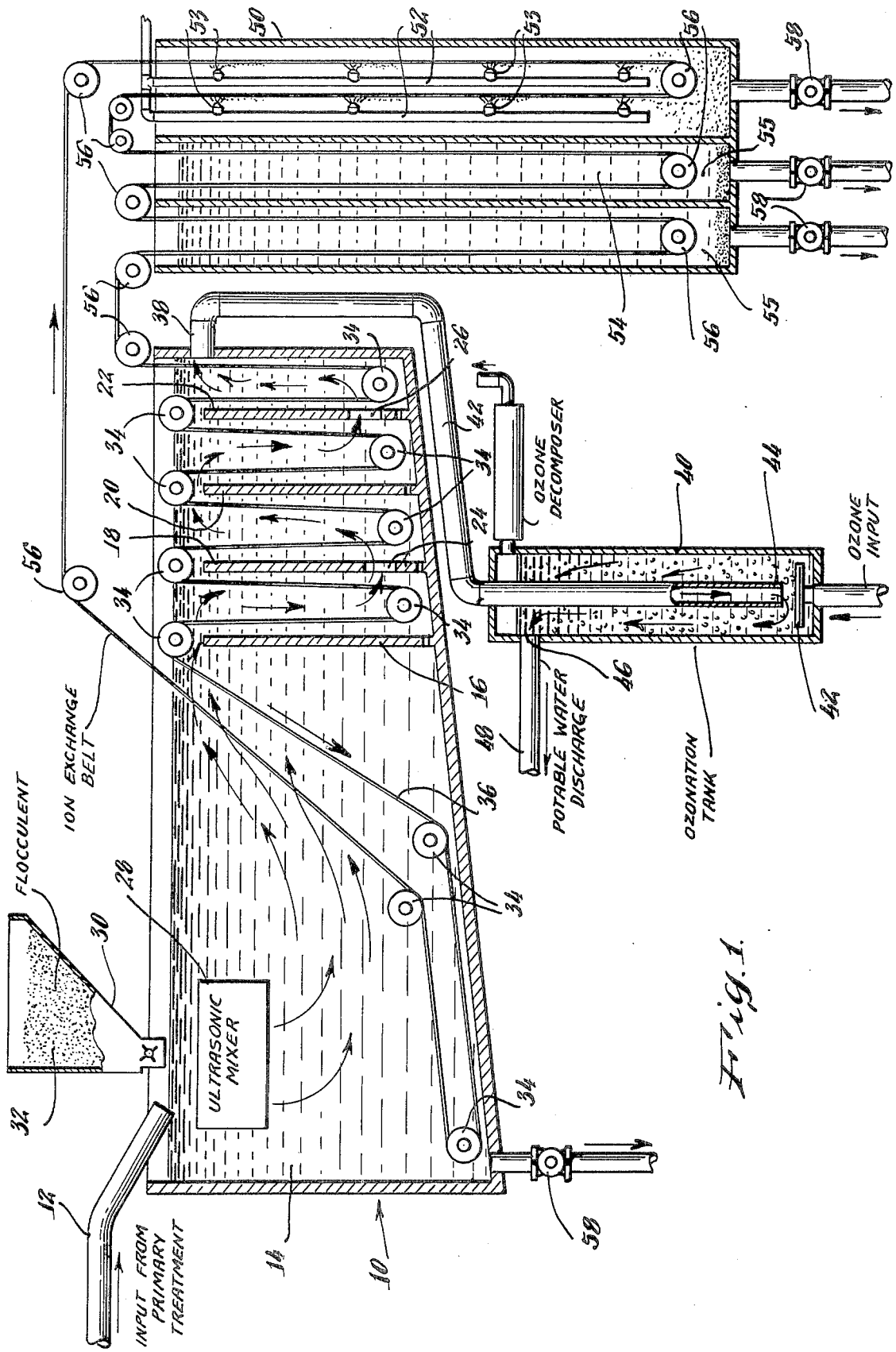

FIG. 1 illustrates one embodiment of the present invention. As shown, it includes a secondary treatment tank 10 into which, via an inlet pipe 12, effluent 14 such as water, may be pumped from a primary treatment facility (not shown) such as primary filtration equipment in a sewage treatment plant. The tank 10 has baffles 16, 18, 20, 22 positioned at the opposite end from the inlet pipe 12. The baffles are at or only slightly lower than the level of the fluid being treated so that only small amounts of the fluid may pass over them. In addition, the second and fourth baffles 18, 20 have large openings 24, 26 respectively near the bottom through which substantial quantities of fluid may pass. By this means, the general path of flow of the fluid through the tank 10 is more or less as shown by the dashed line. A desirable option is to include an ultrasonic device 28 of known design in association with a supply 30 of flocculant enhancing material 32 by means of which flocculation of the material to be removed may be enhanced as an aid to its removal from the fluid medium. Positioned within the tank 10 are carrier rolls 34 which support the endless belt 36 which, in this embodiment, serves as the separation means. At the end of the tank 10 opposite inlet pipe 12 is an outlet 38 connected to an optional tertiary treatment tank 40 by means of a pipe 42. The tertiary tank 40 includes an ozone input source 42, connected to an ozone generator of known design per se, the source 42 being positioned opposite to and juxtaposed to the discharge orifice 44 of the pipe 42 as to ensure maximum exposure of the fluid coming from the tank 10 to ozone for the purposes hereinafter described. The tertiary tank 40 has a discharge orifice 46 and an associated pipe 48 to carry away fluid emitting from the tertiary tank 40.

Associated with the apparatus, is a means for removing solids collected on the belt 36 and for re-establishing the ion potential of the belt 36. As illustrated, these functions are achieved by means of a solid waste removal column 50 containing an internal spray pipe 52 having a multiplicity of high pressure spray nozzles 53 which serve to provide a spraying action to knock solid particles off the belt as it passes through the column 50 past the nozzles 53. Next in tandem along the line of travel of the belt 38 is an ion re-charger 54 of known design per se by which the ionized bias (i.e., either anionic or cationic, according to the ionization of the materials to be extracted) of the belt 36 is re-established. This re-charger is followed by a water rinse tank 55 to remove any excess ion recharging material left on the belt from the re-charging operation, which it is desired not to have pass further into the system; all as known per se. As illustrated, various carrier rolls 56 outside of the tank 10 support the belt 36 along its path of travel and provide means whereby directional changes in the path of travel of the belt may be achieved. In addition, valved drains 58 may be provided as shown to facilitate removal of accumulated solids from various locations in the system where they tend to collect.

The belt 36, which may be in a number of different forms as hereinafter described, is made continuous in the form of a closed loop, either by having been endless-woven, or by having been flat-woven and the ends joined; all as known per se, for example, in the field of papermakers felts and fabrics. In addition, the belt is rendered capable of exhibiting ionic bias; anionic or cationic, or either or both. Various techniques may be utilized to produce belts useful for achieving these ends, but particularly desirable means of doing so for the purpose herein described is to manufacture the belts using ion exchange resins, either as coatings or adherents on, or impregnants of, or in the form of, constituent yarns of such belts, or to associate masses of ion exchange resins at sequential points along the belt; all as hereinafter described. The belt also is foraminous or pervious to facilitate the passage of fluid therethrough. The flow paths through the belt, however, while desirably large and abundant enough to facilitate the easy passage of fluid, are small enough to enhance the effectiveness of the belt as a filtration medium, thereby forming a separation means for removing desired materials from the fluid being processed. This has the added advantage of providing a large surface area over which the incorporated material which is capable of being made to exhibit ionic bias may be exposed thereby enhancing the ionic exchange phases of the extraction process as hereinafter described.

Figure 2:
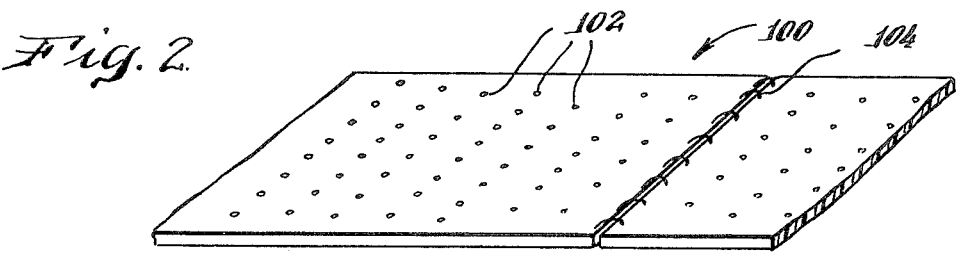

FIGS. 2, 3, 4, 5 and 6 illustrate various embodiments of belts which may be used in the practice of the present invention. In FIG. 2, there is illustrated a belt which may be used in the practice of the present invention comprising one or more thin sheets 100 made from an ion exchange resin.

The belt shown in FIG. 2, which may be on the order of 1.5 mm to 20 mm in thickness, with a width typically of 1.5 to 3 meters and a length typically of up to 45 meters, has apertures 102 therein made by perforating or other known per se techniques on the order of 0.064 to 0.254 cm in diameter (or the area equivalent thereof if such apertures are not round holes), preferably with such apertures comprising about 50% of the total surface area of the belt. In this embodiment, as in the others herein discussed when they are made by being flat-woven (as contrasted with the endless weaving methods used to produce papermaker's felts, for example), or by the use of several sheets of plastic which may be positioned end to end to form the complete loop of the belt, abutting ends may be joined to each other by a joining means 104 in the form of a spiral spring as shown or clipper hooks and pintle yarns, or other appropriate means which are known per se in the art of joining belt ends together.

Figure 3:
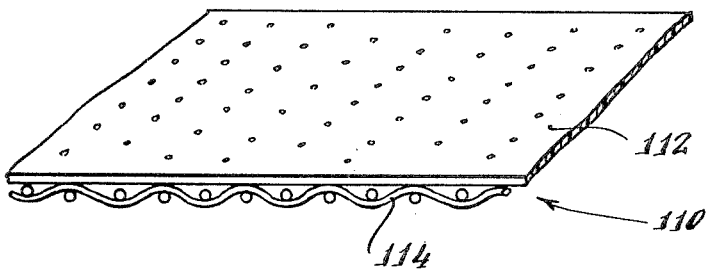

FIG. 3 illustrates another embodiment of a belt 110 useful in the present invention, utilizing thinner membranes than those used in the embodiment shown in FIG. 2. In the FIG. 3 embodiment, a membrane 112 is used which is made from an ion exchange resin such as that suggested for use in the FIG. 2 embodiment, but may be on the order of 0.00127 to 0.0254 cm. in thickness, made from fibrous materials in a very open configuration or with apertures therein made by punching or other known per se techniques whereby, again, the effective open area may be rendered to at least 50% of the total projected plan view area of the sheet. However, because of the thinness, and therefore inherent structural weakness of the material, it is desirable to reinforce the belt with a very open weave, reinforcing scrim or fabric 114, made from metal, synthetic, or natural materials or combinations thereof to which the membrane 112 may be bonded by adhesives or other known per se methods. Optionally, a second such reinforcing scrim (not shown) may be positioned on the opposite side of the membrane 112.

Figure 4:
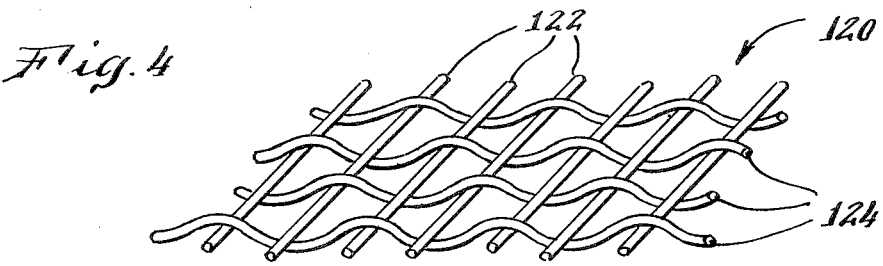
Figure 5:
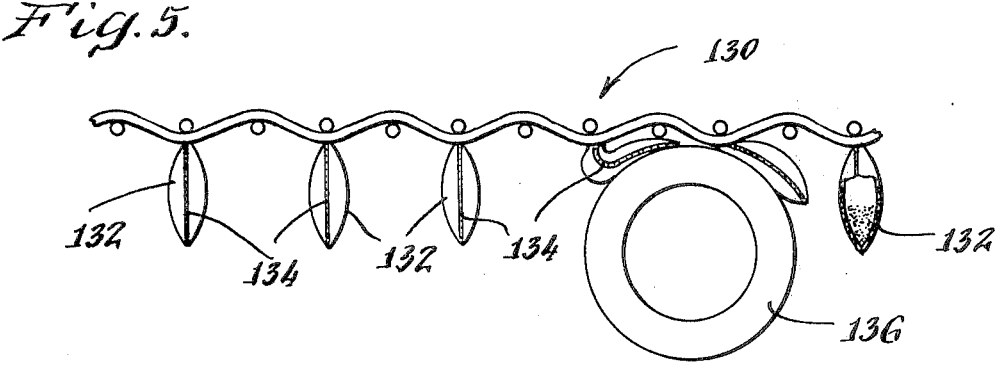
Figure 6:
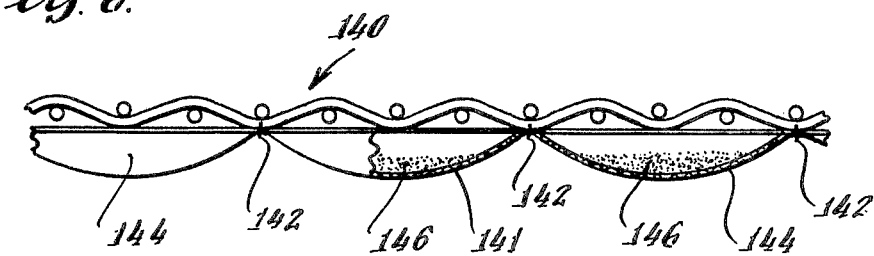

FIG. 4 illustrates another belt 120 which may be used in the practice of the present invention, comprising yarn arrays 122, 124 which are interwoven with each other and are oriented at right angles to each other, all in accordance with known per se weaving methods. Although FIG. 4 as do also FIGS. 3, 5, and 6, illustrates so-called "plain weaves", it will be apparent that any of a wide variety of other weave configurations known in the weaving arts may be used advantageously, according to the specific results desired, such as satin weaves, twills, lenos, etc. However, the open-weave, woven structure illustrated in FIG. 4 preferably is made having cross-machine direction yarns (i.e., loom wefts in flat-woven goods and loom warps in endless-woven goods) made in whole or in part from ion exchange resins, in the form of all or part of the constituent fibers in a yarn made from staple, or in the form of some or all of the single end filaments used to produce a multi-filament yarn, or in the form of monofilament yarns. Although ordinarily it will be preferred to have most or all of the ion exchange material in the cross-machine direction because such materials tend not to be as strong as other materials, such as synthetics such as polyesters or polyimides, or natural materials such as wool or cotton, or mixtures of synthetics and natural materials, since this will made it possible to achieve greater structural strength in the machine direction yarns which ordinarily bear most of the mechanical stresses encountered in operation. Although these properties and considerations have been discussed in connection with the belt construction shown in FIG. 4, it is to be understood that such a belt construction comprising ionic exchange resins in its various forms may also be utilized as a reinforcing scrim in connection with belts like those shown in FIG. 3, or as carrier belts like those shown in FIGS. 5 and 6.

FIG. 5 illustrates a belt 130 useful in the practice of the present invention comprising a carrier belt 130, which may, as noted above, have ion exchange properties but preferably is designed primarily for its strength and filtration characteristics and is made from metal, synthetic or natural materials or combinations thereof and has affixed thereto a multiplicity of elongated bags 132 made from materials such as nylon or dacron and having hole openings in the order of 0.00254 to 0.19 cm. in diameter oriented more or less in the cross-machine direction of the belt. Although desirably each bag extends substantially entirely across the belt, alternatively a multiplicity of shorter bags (not shown) may be positioned end-to-end, or in staggered configurations so as to effect a more or less uniform distribution. The bags 132 may have closure devices 134 such as zippers in their ends whereby the bags may be opened and ion exchange material, such as resin in granular form, may be removed and/or replaced from time to time as desired. The belt carrier rolls 134 corresponding to rolls 34, 56 shown in FIG. 1, preferably have a soft outer surface to accomodate the physical presence of the bags positioned between the belts and the roll face as the belt travels along. In this connection, it will be apparent that it is advantageous to have any given cross-machine span of containers for ion exchange materials in the form of a multiplicity of short bags which are in a staggered configuration, since this will tend to even out their distribution along the line of contact between the roll circumference and the belt, thereby minimizing or eliminating "pounding". For the same reason, it is desirable to orient the bags at an angle to the cross-machine direction rather than at right angles thereto. These same considerations apply as well to the "pillows" shown in FIG. 6.

FIG. 6 illustrates a belt 140 having an associated fabric layer 141 which may be made from material such as that used to make the bags 132 shown in FIG. 5, and is longer than the belt 140, and is secured thereto along a series of stitch lines 142 with the excess length of the layer 141 formed into festoons or pillows between the stitch lines 142, wherein ion exchange material 144, in the form of granular resin may be positioned, and replaced or removed therefrom by means of opening devices (not shown) such as zippers or the like in the pillows.

To produce the ionic exchange membrane referred to above, one may use Ionac Chemical Company No. MC-3142 (cation) and/or No. MA 3148 (anion). Granular forms of ionic exchange resins which may be used include Inoac Chemical's C-257 (cation) and/or A-548 (anion), Dow Chemical's HCR-S (cation) and/or SBR-Dowex (anion), Rohm and Hass' Amberlite IRA 900C (cation) and/or IRA-200C (anion), or Diamond Shamrock's Duolite No. A-109-Anion and/or No. ES-26-Cation. Some of the foregoing are also capable of being extruded into filaments for weaving, or of being formed into sheets suitable to be slit into ribbons suitable to use as weaving filaments.

It is to be understood that the apparatus and separation means herein described may be utilized to separate and remove materials from fluids other than liquids, as well as from liquids other than water. Thus, for example, with appropriate modifications and equivalents which will be apparent to those skilled in the arts, liquid chemicals may be treated utilizing embodiments of the present invention. Similarly, gaseous fluids, such as air, may also be so treated. For example, in the latter case the processing chamber mose advantageously might be a closed chamber rather than an open tank, and in the former case the ion recharging and rinse steps would utilize materials which are compatable with those being treated.

It should be noted that the separation means described herein are characterized by being "foraminous", by which is meant that they have discrete passageways therein which are large enough to pass fluids therethrough readily, but small enough to filter out the larger particles among those entrained in the fluid being processed.

As may be seen from FIG. 1, the operation of the apparatus depicted therein is as follows. Effluent water from a primary treatment plant (not shown) enters the secondary treatment plant 10 by means of the inlet pipe 12. As the fluid enters the tank, it is mixed with a material 32 which will enhance the flocculation of particles, and is subjected to a process which will ensure thorough mixing of the flocculant material and that the solids are broken up as much as possible. This may be done, for example, by an ultrasonic mixer 28 of known design per se. The fluid then flows toward the baffles 16, 18, 20, 22 in the end of the tank 10 where it travels more or less along a flow path which is serpentine as it passes above and through the apertures 24, 26 in successive baffles, until finally it passes from the tank 10 through the outlet 38 and into the egress pipe 42. However, at the same time, the separation means in the form of the belt 36 is moving in the direction illustrated, and this motion in combination with the travel of the belt 36 over the carrier rolls 34 in effect, causes the belt 36 to cross the flow path of the fluid in a series of transversals, the successive positions of which are counter-directional to the fluid flow path, or in other words, sequentially "upstream". Thus, it will be clear that as the belt 36 has just left the water rinse 55 as it enters the tank 10 just above the outlet 38, the belt 36 is at its greatest potential for ionic transfer to it to take place. As it moves along making successive transversals of the fluid flow path, its potential for ionic exchange decreases progressively, but this technique for separating materials from the fluid is less urgently needed because the particles of material in the fluid encountered by the belt in each successive transversal become progressively larger. Thus the belt, being foraminous, increasingly performs a mechanical separation function by filtration rather than by ion exchange. Thus, during the last tranverse of the belt 36 from the location of the tank 10, just before it passes through the surface of the fluid to the first of the outside carrier rolls 56, it is exposed to the most coarse particles in the fluid. Thereafter the belt may pass to the solid waste removal apparatus 50 and on into the ion regenerator 54, thereby to be reconditioned for another traverse of its closed path of travel. FIG. 1 also illustrates tertiary treatment apparatus in the form of a tank 48 into which ozone is disbursed through a source 42 connector to an ozone generator 44 (not shown). Thereby, effluent from the tank 10 which travels through the pipe 42 is discharged from the orifice 44 in impingement relationship to the ozone generator 42, thereby ensuring maximum exposure of the fluid to the ozone. The effect of this as is well known in the cognizant arts, is to more or less completely oxidize any organic matter left in the fluid, thereby "ozonating" it, or rendering it substantially pure and untainted. In this condition, potable water, for example, may be discharged through the outlet 46 and into the pipe 48.

It is to be understood that the preceding discussion, and the embodiments described, illustrated and claimed herein, are by way of illustration and not of limitation, and that this invention may be practiced in a wide variety of embodiments without departing from the spirit or scope of this invention.

I claim:

1. A method for separating and receiving selected materials from fluid medium contaminated with said materials comprising:

flowing said contaminated fluid medium through a separating tank forming a flow path for said fluid to be processed from a first inlet location to a second outlet location at the opposite end of said separating tank causing an endless foraminous belt which includes ion exchange resin to move through said flowing contaminated fluid medium in a multiplicity of serpentine transversals and in a direction such that said belt will pass through said transversals in a sequence which is counter directional to the flow of said contaminated fluid medium from the first inlet location to said second outlet location, whereby purified fluid medium is caused to exit said second outlet location of said separating tank.

2. A method of claim 1 wherein the contaminated fluid medium is caused to flow counter directional to the endless foraminous belt and said endless belt first enters and transverses the contaminated fluid medium in the separating tank at a point near the second outlet location and exits the contaminated fluid in the separating tank at a point near the first inlet location.

3. The method described in claim 2 having the additional steps of mixing flocculant with said contaminated fluid medium in the separating tank at the point before the flowing contaminated fluid first contacts the endless belt exiting the separating tank.

4. The method described in claim 2 having the additional steps of ozonating fluid medium effluent which has flowed past the endless belt at the point where the endless belt first enters and transverses the fluid medium in the separating tank.

5. The method described in claim 3 having the additional steps of ozonating fluid medium effluent which has flowed past the endless belt at the point where the endless belt first enters and transverses the fluid medium in the separating tank.

* * * * *